A. SUNDH.
GEAR PUMP.
APPLICATION FILED JAN. 17, 1910.
1,105,312.
Patented July 28, 1914.
2 SHEETS—SHEET 1.
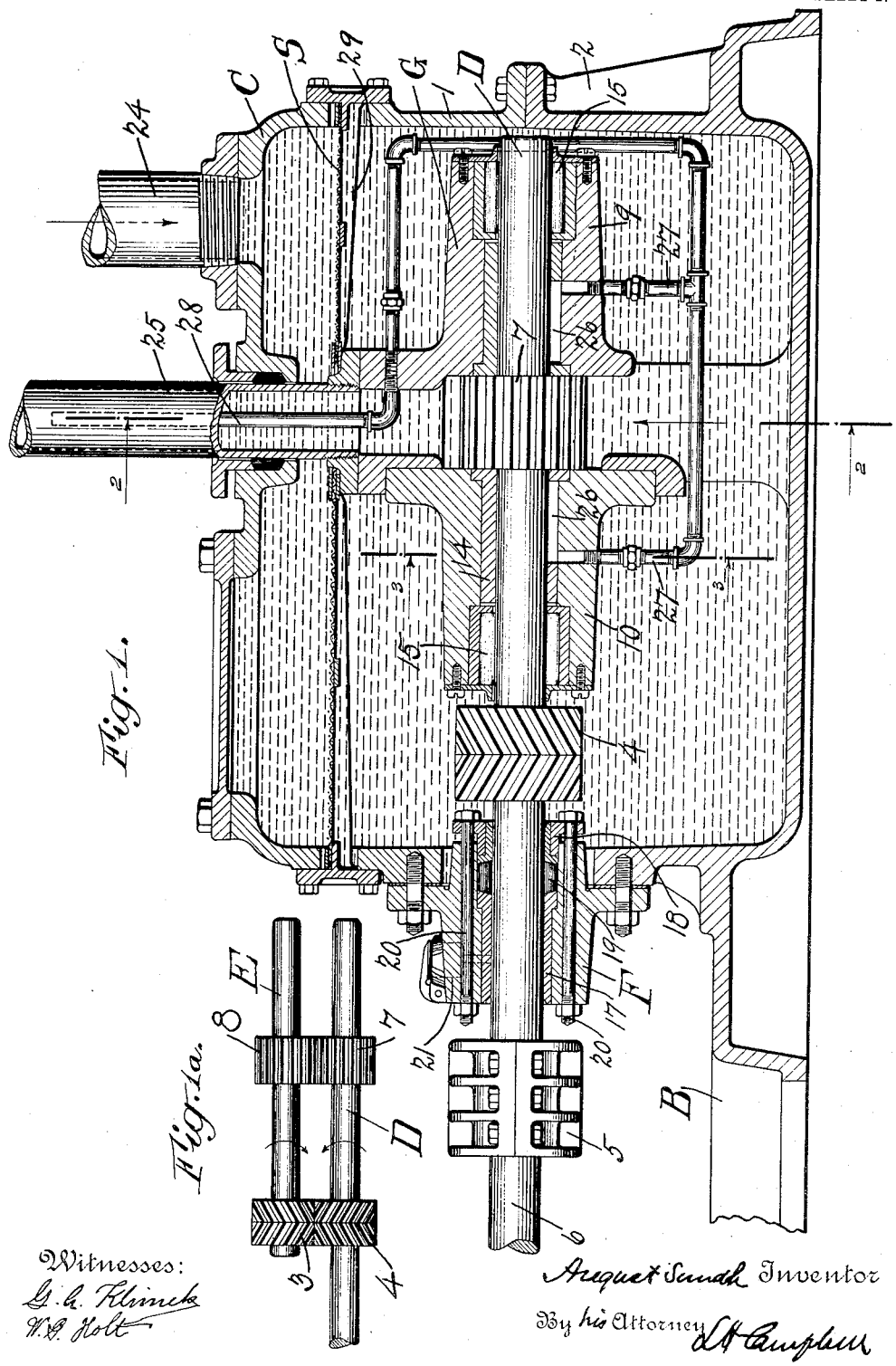

A. SUNDH.
GEAR PUMP.
APPLICATION FILED JAN. 17, 1910.
1,105,312.
Patented July 28, 1914.
2 SHEETS—SHEET 2.
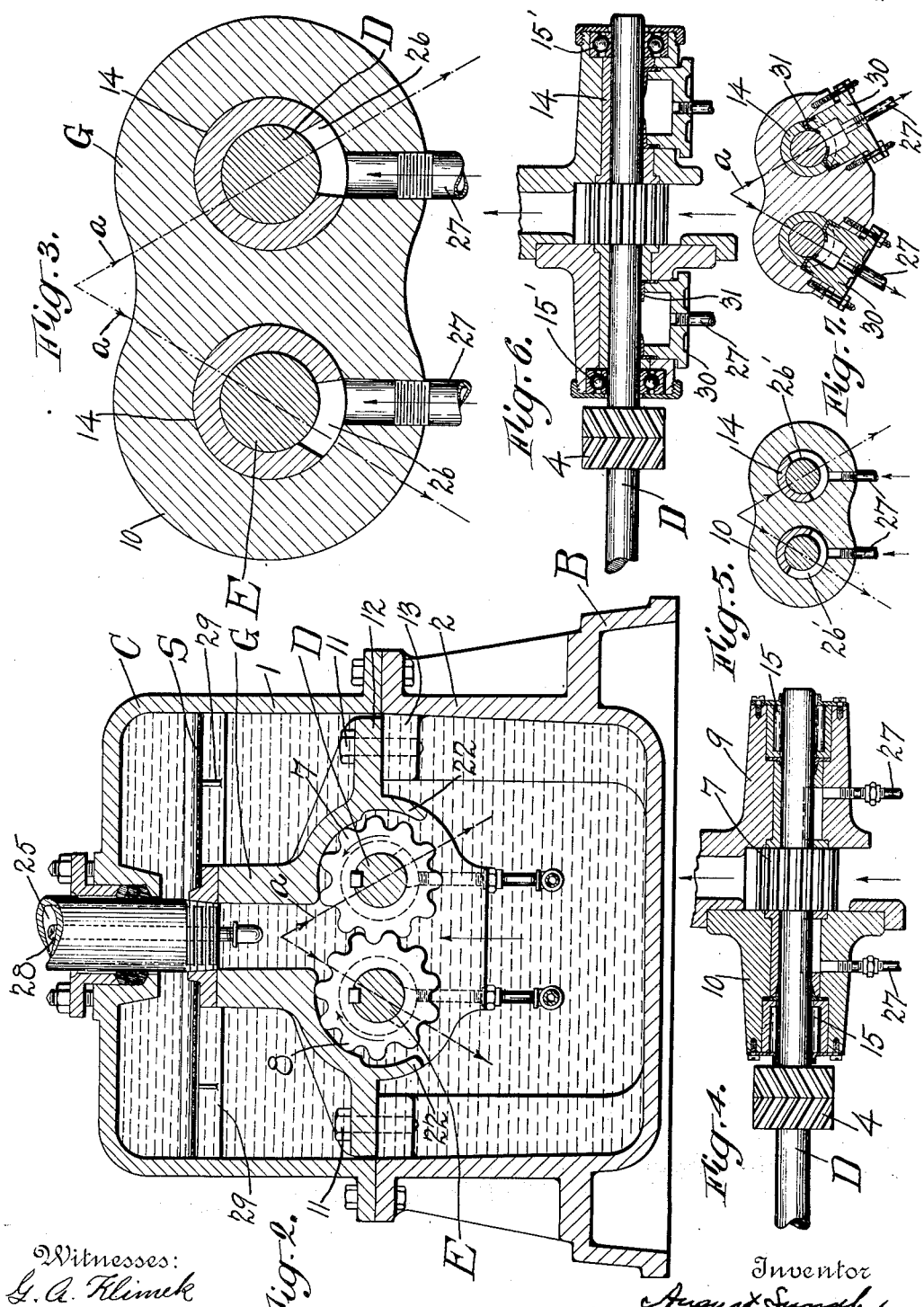

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

GEAR-PUMP.

1,105,312.      Specification of Letters Patent.      Patented July 28, 1914.

Application filed January 17, 1910. Serial No. 538,428.

*To all whom it may concern:*

Be it known that I, AUGUST SUNDH, a citizen of the United States, residing at Yonkers, in the county of Westchester and State of New York, have invented a new and useful Improvement in Gear-Pumps, of which the following is a specification.

My invention relates to improvements in pressure for pumps of the rotating type, and as herein shown is embodied in a rotary gear pump.

An object of the invention is to relieve or counteract excessive pressure ordinarily placed on the shaft bearings in mechanism of this kind, due to the fluid pressure being greater on one side of the gears than the other. This object is attained by providing means for applying a counteracting liquid pressure to the shafts.

Another object of the invention is to provide a construction in which the pump gears will not be brought into frictional contact with the walls of the casing in which they rotate when the shaft bearings become worn.

The invention further aims to provide a pump of the class indicated which may be run at a high speed and under high pressure, and at the same time maintain a high efficiency, and in which the operation will be practically noiseless.

Other objects of the invention, and the exact nature thereof, will appear hereinafter.

The scope of the invention is defined in the appended claims in which are set forth the novel combinations of elements.

Referring to the accompanying drawings in which is illustrated a rotary gear pump embodying the principles of my invention—Figure 1 is a sectional elevation view of the pump; Fig. 1ª is a detail view of the pump shafts and gearing; Fig. 2 is a sectional elevation as indicated by the lines 2—2 of Fig. 1; Fig. 3 is a sectional elevation taken on the plane indicated by the line 3—3 of Fig. 1, but on a larger scale; Fig. 4 is a detail view of one of the pump shafts and associated mechanism; Fig. 5 is a view similar to Fig. 3 showing a slightly modified construction; Fig. 6 is a view similar to Fig. 4 but showing certain modifications; Fig. 7 is a view similar to Fig. 5 but showing a modification.

The pumping mechanism is preferably inclosed in a casing C which comprises upper and lower sections 1 and 2, bolted or otherwise secured together when the machine is assembled. The lower section 2 is secured to or formed integral with a bedplate or base B. Within the casing C is a drive shaft D and a driven shaft E, a pair of herring-bone gears 3 and 4 forming a positive driving connection between said shafts. The drive shaft D is connected through a coupling 5 to a shaft 6 which may be the shaft of an internal combustion engine, an electric motor, or may be connected to any suitable source of power for driving the pump. Intermeshing pump gears 7 and 8 are keyed to the shafts D and E respectively. These gears are formed with round gear teeth, as disclosed in my co-pending application Serial No. 544,640, filed Feb. 18, 1910, the ends of the teeth being substantially semicircular so that as the gears rotate the liquid will not be locked between the gears and cause binding. The use of the gears 3 and 4 is of importance not only in transmitting the driving power for the shaft E independently of the pump gears but in maintaining the pump gears in proper relation as they rotate. The drive gears prevent any independent rotation of the shafts D and E whereas without the use of these drive gears a slight relative movement of the two shafts is permitted by the pump gears and it is found that the pump gears cannot be rotated uniformly without the drive gears 3 and 4. By holding the pump gears accurately in proper intermeshing relation, the drive gears serve to prevent frictional losses and wear of the pump gear teeth and the leakage incident to the irregular movement of the pump gears and the wear of the gear teeth. Within the outer casing C is a gear case G in which the pump gears rotate. This gear case preferably consists of two sections 9 and 10, which may be rigidly secured within the outer casing C by means of bolts 11 extending through flanges formed on the case G and into lugs or brackets 13 formed integral with the outer casing C. Members 9 and 10 of the gear case are provided with longitudinal openings in which are placed sleeves 14 through which extend the pump shafts D and E. Roller bearings 15 for the pump shafts are located within the outer ends of the gear case. The shaft E is preferably of such length as to be located wholly within the casing C. The drive shaft D extends through a journal box F bolted or otherwise secured to the left hand end of the casing. Within this journal box is a bearing sleeve 17. A stuffing box comprising a gland 18 is located within the casing, a packing 19 being placed between said gland and the bearing sleeve 17. Bolts 20 extending through the journal box F provide means for adjusting the gland 18. An oil cup 21 permits lubrication of the bearing. With the arrangement here shown in which the stuffing box is located at the inner end of the bearing, the latter is not subjected to the corroding action of the water or other liquid within the casing and the bearing is easily kept lubricated.

The inner walls 22 of the gear case G as shown in Fig. 2, are arc shaped and located in close proximity to the gears, so that as the latter are rotated in the directions indicated by the curved arrows the liquid is carried upward between the walls 22 and the gears, practically no liquid being carried downward between the gears. Instead of having the walls 22 of the gear case extended downward to a point beneath the gear shafts, as is usual, said walls are extended only a short distance below the axes of the gear shafts. As shown in Fig. 2, the portions of the side walls 22 in contact with, or close proximity to, the gear wheels, extend downward to or only a short distance below the diameters of the gear wheels perpendicularly to the arrows $a$. The purpose of this is to prevent the gears from coming in contact with the casing when the shaft bearings become worn and the shafts settle. With the ordinary arrangement as the shaft bearings become worn the gear wheels are brought into contact with the walls of the casing, causing rapid wear of the gear wheels and casing and thereby permitting leakage. This necessitates not only the renewal of the shaft bearings, but also new pump gears, and often a new pump case, whereas with the present construction, any wear of the bearings which may cause leakage necessitates only the use of new bushings or shaft bearings. The friction between the gears and casing is also considerable owing to the large diameter of the gears, causing a great loss of power. With the present construction these objections are overcome.

The circulating liquid may be either water, oil or some other liquid, some features of the present invention being of especial value in connection with the use of water as a circulating liquid. The liquid which fills the casing C enters the latter through a supply pipe 24 and is pumped upward through the gear casing into the pressure pipe 25.

It has been found in practice, that the unbalanced pressure of the liquid on the pressure side of the pump gears reacting through the gear shaft causes a heavy pressure on the shaft bearings, greatly reducing the efficiency of the pump; as well as causing considerable wear at the bearings. In order to counterbalance or partially counterbalance this pressure the following means is provided: The bearing sleeves 14 each have a portion cut away to leave an open space 26 between the lower surface of the gear shaft and the gear case. These spaces 26 communicate with pipes 27 connected to a common pressure pipe 28 within the pressure pipe 25. The resultant pressure on the pump shafts of the liquid above the gears is substantially in the directions indicated by the arrows $a$. The openings 26 in the bearing sleeves 14 are so located that the pressure transmitted through the pipes 28 and 27 to the gear shafts is substantially in the line of the arrows $a$, but in an upward direction. The area exposed to this upward liquid pressure is preferably such that the upward pressure will be somewhat less than the downward pressure due to the liquid above the gears and the weight of the parts; so that the shafts will always bear on the lower sides of the sleeves 14 and thereby prevent leakage through the openings 26, which might occur if the upward pressure were sufficient to overbalance the downward pressure. By thus counterbalancing the greater portion of the downward pressure the friction at the bearings is greatly reduced and the efficiency of the pump increased. This arrangement moreover makes it practical to use the roller bearings 15, thereby securing a very high efficiency. The pressure on the roller bearings being light they operate with little wear without any lubrication, it being impractical to lubricate these bearings when located within the casing C and surrounded by water. The pipe 28 is preferably extended upward for some distance in order to secure a practically constant pressure, or a pressure proportional to that supplied to the mechanism operated by the circulating liquid.

In order to prevent grit and dirt or other foreign substances getting into the pump a large screen S is provided. This screen, preferably the length and width of the casing as shown, is supported by a horizontal frame work 29. The area of this screen is made large so that it will permit the free passage of the circulating liquid. The outer casing C keeps the drive gears 3 and 4 in constant contact with the circulating fluid and thereby reduces the wear. The noise of the gears is also deadened by being immersed in the liquid and leakage from the pump is returned to the supply side of the pump.

In Fig. 5 the openings 26′ in the sleeves 14 are substantially semicircular in cross section, thereby increasing the upward pressure of the liquid. The upward pressure in this instance is preferably sufficient to overcome the downward pressure and hold the shafts against the upper sides of the bearings.

Figs. 6 and 7 illustrate a somewhat modified construction showing the use of ball bearings 15' in place of the roller bearings 15. These figures also show packing glands with packings 31 to prevent leakage of the liquid through the sleeves 14. With this arrangement the downward pressure of the liquid on the gear shafts may be completely counter-balanced thereby reducing the friction at the bearings to a minimum.

Although I have described the invention particularly as applied to a rotary gear pump, it will be understood that the principles of the invention are applicable also to rotary gear motors operated by liquid pressure, and that the invention is not limited to the particular type of construction illustrated. Various changes in the details of construction and arrangements of parts might also be made without departing from the spirit and scope of the invention, I wish therefore not to be limited to the particular features of construction herein disclosed.

What I claim as new, and desire to secure by Letters Patent of the United States is:—

1. In pumping apparatus, the combination with intermeshing pump gears, shafts carrying said gears, sleeves located on opposite sides of said gears and in which said shafts are journaled, said sleeves being provided wtih openings exposing portions of said shafts, and ducts establishing communication between the pressure side of the pump and said openings.

2. In pumping apparatus, the combination with intermeshing pump gears, shafts carrying said gears, sleeves located on opposite sides of said gears and in which said shafts are journaled, said sleeves being provided with openings exposing portions of said shafts, and means for introducing fluid pressure from the pressure side of the pump into the said sleeve openings to counteract the fluid pressure on the said pump gears.

3. In pumping apparatus, the combination with intermeshing pump gears, shafts carrying said gears, sleeves located on opposite sides of said gears and in which said shafts are journaled, said sleeves being provided with openings exposing portions of said shafts, and means for introducing fluid under pressure into the said sleeve openings to counteract the variable pressure to which the gear-carrying shafts are subjected during the operation of the pump.

4. In pumping apparatus, the combination with intermeshing pump gears, shafts carrying said gears, sleeves located on opposite sides of said gears and in which said shafts are journaled, said sleeves being provided with openings exposing portions of said shafts, flexible packing in said sleeve openings, and means for introducing fluid pressure from the pressure side of the pump into said sleeve openings and against said packing and thereby effect a fluid tight joint and at the same time counteract the pressure to which the gear carrying shafts are subjected during the operation of the pump.

5. In pumping apparatus, the combination with intermeshing pump gears, shafts carrying said gears, sleeves located on opposite sides of said gears and in which said shafts are journaled, said sleeves being provided with openings exposing portions of said shafts, anti-friction bearings for said shafts adapted to relieve said sleeves of all wear and friction, and means for introducing a fluid pressure into said sleeve opening to counteract the pressure set up in said bearings due to the action of the pump when operating against a pressure.

6. In pumping apparatus, the combination with intermeshing pump gears, shafts carrying said gears, sleeves located on opposite sides of said gears and in which said shafts are journaled, said sleeves being provided with openings exposing portions of said shafts, and means for conducting fluid pressure from the pressure side of the pump and taken at a point removed from the pump gears when the pressure is free from pulsation to the said sleeve openings to counteract the pressure set up in said bearings during the operation of the pump.

In testimony whereof, I have signed my name to this specification in the presence of two subscribing witnesses.

AUGUST SUNDH.

Witnesses:
JOHN F. RULE,
JAMES G. BETHELL.